US012755746B2

(12) United States Patent
Yang et al.

(10) Patent No.: US 12,755,746 B2
(45) Date of Patent: Oct. 6, 2026

(54) CONTROL OF A VOLUME LEVELING UNIT USING TWO-STAGE NOISE CLASSIFIER

(71) Applicant: DOLBY LABORATORIES LICENSING CORPORATION, San Francisco, CA (US)

(72) Inventors: Ziyu Yang, Beijing (CN); Lie Lu, Dublin, CA (US); Zhiwei Shuang, Beijing (CN)

(73) Assignee: DOLBY LABORATORIES LICENSING CORPORATON

( * ) Notice: Subject to any disclaimer, the term of this patent is extended or adjusted under 35 U.S.C. 154(b) by 114 days.

(21) Appl. No.: 18/835,248

(22) PCT Filed: Feb. 6, 2023

(86) PCT No.: PCT/US2023/062062
§ 371 (c)(1),
(2) Date: Aug. 1, 2024

(87) PCT Pub. No.: WO2023/150756
PCT Pub. Date: Aug. 10, 2023

(65) Prior Publication Data

US 2025/0166652 A1 May 22, 2025

Related U.S. Application Data

(60) Provisional application No. 63/312,921, filed on Feb. 23, 2022.

(30) Foreign Application Priority Data

Feb. 7, 2022 (WO) ................ PCT/CN2022/075381
Mar. 9, 2022 (EP) .................................... 22161093

(51) Int. Cl.
*G10L 21/0224* (2013.01)
*G06F 3/16* (2006.01)
(Continued)

(52) U.S. Cl.
CPC .......... *G10L 21/0224* (2013.01); *G06F 3/165* (2013.01); *G10L 21/034* (2013.01)

(58) Field of Classification Search
CPC ................................. H03G 3/32; G10L 21/02
See application file for complete search history.

(56) References Cited

U.S. PATENT DOCUMENTS 5,796,847 A 8/1998 Kaihotsu
8,184,834 B2 5/2012 Oh
(Continued)

FOREIGN PATENT DOCUMENTS

JP 2012070024 A 4/2012
WO 2014011959 A2 1/2014
(Continued)

OTHER PUBLICATIONS

Miranda, André LB, et al. "Use of classification algorithms in noise detection and elimination." International Conference on Hybrid Artificial Intelligence Systems. Berlin, Heidelberg: Springer Berlin Heidelberg, 2009. (Year: 2009).*
(Continued)

*Primary Examiner* — Jialong He

(57) ABSTRACT

Volume leveling of an audio signal using a volume leveling control signal. The method comprises determining a noise reliability ratio w(n) as a ratio of noise-like frames over all frames in a current time segment, determining a PGC noise confidence score $X_{PGN}^{(n)}$ indicating a likelihood that professionally generated content, PGC, noise is present in the time segment, and determining, for the time segment, whether the noise reliability ratio is above a predetermined threshold. When the noise reliability ratio is above the predetermined threshold, the volume leveling control signal is updated based on the PGC noise confidence score, and when the noise reliability ratio is below the predetermined threshold, the volume leveling control signal is left
(Continued)

unchanged. Volume leveling is improved by preventing boosting of e.g. phone-recorded environmental noise in UGC, while keeping original behavior for other types of content.

15 Claims, 1 Drawing Sheet

(51) Int. Cl.
*G10L 21/034* (2013.01)
*H03G 3/32* (2006.01)

(56) References Cited

U.S. PATENT DOCUMENTS

| | | | | |
|---|---|---|---|---|
| 8,761,406 | B2 | 6/2014 | Ohkuri | |
| 9,280,982 | B1 * | 3/2016 | Kushner | G10L 21/0232 |
| 9,621,124 | B2 | 4/2017 | Lu | |
| 9,842,605 | B2 | 12/2017 | Lu | |
| 9,847,096 | B2 | 12/2017 | Konjeti | |
| 10,466,959 | B1 | 11/2019 | Yang | |
| 2007/0092089 | A1 * | 4/2007 | Seefeldt | H03G 9/025 381/104 |
| 2014/0016791 | A1 * | 1/2014 | Smith | H03G 3/32 381/57 |
| 2016/0049915 | A1 * | 2/2016 | Wang | H03G 3/32 381/107 |
| 2016/0191007 | A1 | 6/2016 | Li | |
| 2018/0006870 | A1 | 1/2018 | Mcchord | |
| 2020/0403593 | A1 | 12/2020 | Wang | |
| 2021/0185466 | A1 | 6/2021 | Gandhi | |

FOREIGN PATENT DOCUMENTS

| | | | | |
|---|---|---|---|---|
| WO | 2021119214 | * | 6/2021 | G10L 21/0208 |
| WO | 2023028018 | A1 | 3/2023 | |

OTHER PUBLICATIONS

Miyake, Nobuyuki, Tetsuya Takiguchi, and Yasuo Ariki. "Noise detection and classification in speech signals with boosting." 2007 IEEE/SP 14th Workshop on Statistical Signal Processing. IEEE, 2007. (Year: 2007).*

* cited by examiner

CONTROL OF A VOLUME LEVELING UNIT USING TWO-STAGE NOISE CLASSIFIER

CROSS-REFERENCE TO RELATED APPLICATIONS

This application is a U.S. National Stage application under U.S.C. 371 of International App No. PCT/US2023/062062, filed on Feb. 6, 2023, which claims priority to PCT application PCT/CN2022/075381, filed 7 Feb. 2022 and U.S. provisional application 63/312,921, filed 23 Feb. 2022 and European Patent Application No. 22161093.4, filed 9 Mar. 2022, all of which are incorporated herein by reference in their entirety.

TECHNICAL FIELD OF THE INVENTION

The present invention relates to a method and a system for performing volume leveling of an audio signal.

BACKGROUND OF THE INVENTION

Various audio processing techniques have been applied in playback end-point devices to improve audio quality. An example of an audio processing module is a volume leveling unit, which aims to monitor and adjust loudness of the audio from moment to moment to maintain a consistent loudness for the consumer.

The volume leveling unit was originally developed for Professionally Generated Content (PGC). However, in recent years User Generated Content (UGC) has become increasingly popular and must also be properly handled. Therefore, the volume leveler should ideally be able to ensure good performance for both PGC and UGC.

One of the most important aspects of UGC handling is the environmental noise contained in UGC (hereafter called the UGC noise). The UGC noise can be caused by capturing content using a mobile phone in real scenes. In general, the UGC noise is the background noise and thus meaningless or unwanted. Therefore, the UGC noise—especially approximately stationary noise—should not be boosted by the volume leveling unit.

However, the PGC also contains approximately stationary noise-like content (hereafter called the PGC noise). The PGC noise intervals occur frequently, e.g., as background sound intervals between dialogue in a movie. Such PGC noise is usually captured independently from the dialogue using professional recording devices, and carefully processed by the audio mixer in content creation phase. In contrast to the UGC noise, such PGC noise is part of the content and is usually wanted from an artist/content creator perspective. In such cases, the volume leveling unit can safely boost the PGC noise.

GENERAL DISCLOSURE OF THE INVENTION

The present invention seeks to provide a volume leveling unit which satisfactorily can handle both PGC and UGC noise. Specifically, the boosting level should be reduced for UGC noise while maintain the original behavior for PGC noise. To achieve this objective, the present invention proposes a method and system for intelligently steering a control signal (e.g. between zero and one) for a volume leveling unit.

A first aspect of the present invention relates to a method for applying volume leveling of an audio signal including a plurality of time segments each consisting of a set of N frames. The method comprises providing a volume leveling control signal, applying volume leveling to the audio signal using the volume leveling control signal, identifying, in a current time segment, all noise-like frames which are likely to contain noise, and determining a noise reliability ratio w(n) as a ratio of noise-like frames over all frames in the current time segment, determining, for the current time segment, a PGC noise confidence score $x_{PGC}$ (n) indicating a likelihood that professionally generated content, PGC, noise is present in the audio signal and determining, for the current time segment, whether the noise reliability ratio is above a predetermined threshold. When the noise reliability ratio is above the predetermined threshold, the volume leveling control signal is updated based on the PGC noise confidence score, and when the noise reliability ratio is below the predetermined threshold, the volume leveling control signal is left unchanged.

According to this approach, a noise-type adaptive volume leveling is achieved using a two-stage noise classifier. As a result, the performance of the volume leveling is improved by preventing boosting of e.g. phone-recorded environmental noise in UGC, while keeping original behavior for other types of content. The control signal will be updated if and only if the reliability of noise for the segment is high. As a result, the volume leveling control signal will be stable for each segment, and also stay consistent for the entire audio signal. The update may be made on a frame-by-frame basis.

A two-stage noise classifier can be used with the present invention. In a first stage, noise is distinguished from other types of content, and in a second stage, PGC noise is distinguished from UGC noise. The classifier in the first stage can also output a frame weight to identify stationary noise with low latency, and a clip weight, indicating whether the output from the second stage is reliable or not.

The outputs from the classifiers are not always stable. In order to obtain a stable and consistent control signal, the updated volume leveling control signal may be formed by weighting a volume leveling control signal for a previous frame with an updating value based on the PGC noise confidence score. In order to increase the rate of change when the noise detection is reliable, the updating value can be made proportional to the noise reliability ratio.

A second aspect of the present invention relates to a system for volume leveling of an audio signal including a plurality of time segments each consisting of a set of N frames. The system comprises a noise detector configured to identify, in a current time segment, all noise-like frames which are likely to contain noise, and determining a noise reliability ratio w(n) as a ratio of noise-like frames over all frames in the current time segment, a noise discriminator configured to determine, for the current time segment, a PGC noise confidence score $x_{PGC}$(n) indicting a likelihood that professionally generated content, PGC, noise is present in the audio signal, and a controller. The controller is configured to provide a volume leveling control signal, determine, for the current time segment, whether the noise reliability ratio is above a predetermined threshold, when the noise reliability ratio is above the predetermined threshold, update the volume leveling control signal based on the PGC noise confidence score, and when the noise reliability ratio is below the predetermined threshold, keep the volume leveling control signal unchanged.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

Figure 1:
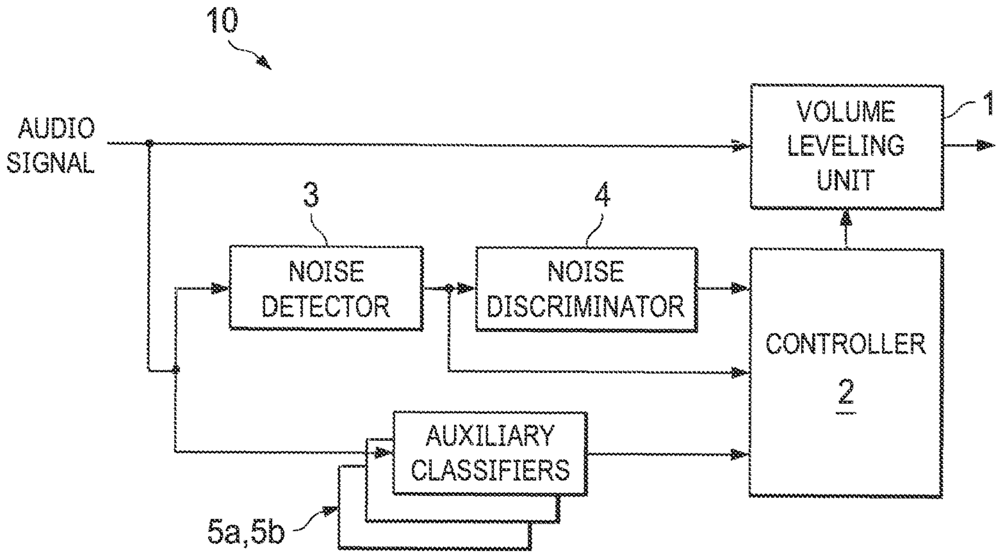
FIG. 1 shows a schematic block diagram of a volume leveling system according to an embodiment of the invention.

Systems and methods disclosed in the present application may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

Certain or all components may be implemented by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including a hard drive, SSD, RAM and/or ROM. A bus subsystem may be included for communicating between the components. The software may reside in the memory subsystem and/or within the processor during execution thereof by the computer system.

The one or more processors may operate as a standalone device or may be connected, e.g., networked to other processor(s). Such a network may be built on various different network protocols, and may be the Internet, a Wide Area Network (WAN), a Local Area Network (LAN), or any combination thereof.

The software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, physical (non-transitory) storage media in various forms, such as EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. Further, it is well known to the skilled person that communication media (transitory) typically embodies computer readable instructions, data structures, program modules or other data in a modulated data signal such as a carrier wave or other transport mechanism and includes any information delivery media.

The volume leveling system 10 in FIG. 1 includes a volume leveling unit 1 including a dynamic range controller (DRC), a controller 2, and an audio classification arrangement including a noise detector 3, a noise discriminator 4, and one or several auxiliary classifiers 5*a*, 5*b*. The noise detector 3 and noise discriminator 4, as well as any auxiliary classifiers 5*a*, 5*b*, may implement a variety of machine learning systems, including an adaptive boosting (AdaBoost) system, a deep neural network (DNN) system, etc. In general, an AdaBoost system combines the output of other learning algorithms, also referred to as "weak learners", into a weighted sum, and is "adaptive" in the sense that subsequent weak learners are tweaked in favor of those instances misclassified by previous classifiers. In general, a DNN system is a neural network having multiple layers between the input layer and the output layer. The implemented machine learning systems will require suitable training using appropriate training data.

In use, an audio signal is provided to the volume leveling unit 1, which applies volume levelling based on a control signal from the controller 2. The audio signal is also provided to the audio classification arrangement, and output from the various classifiers is provided to the controller 2, which adjusts the control signal accordingly. The details of the control signal adjustment will be discussed in more detail in the following.

Figure 2:
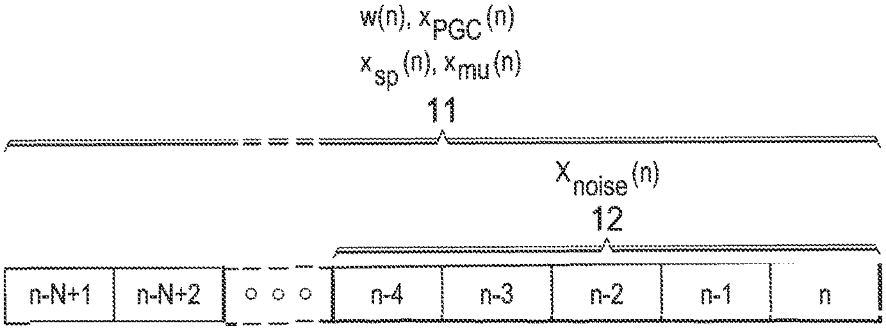
FIG. 2 shows a series of frames including a current frame n.

With reference to FIG. 2, the audio signal is processed one time segment 11 at a time, each time segment (or clip) including a plurality of N successive audio frames—including the current frame n. Taking audio with 48 kHz sampling rate as an example, the typical duration for an audio frame is 1024 samples (about 21.34 millisecond) and an audio clip may include N=48 non-overlapped frames (about 1.024 second).

Consecutive time segments may overlap. In a real-time processing framework, the number of overlapping frames can be set to N−1, which means processing operates frame-by-frame. Without loss of generality, a frame index n here denotes the n-th segment 11 which consists of the n−N+1, n−N+2, . . . , n frames.

With reference to both FIGS. 1 and 2, the noise detector 3 calculates a noise confidence score $x_{noise}(n) \in [0,1]$ indicating the likelihood of stationary noise for the current frame. The noise confidence score may be calculated based on a relatively short time window 12, e.g. five frames including the current frame n. In FIG. 2, the window 11 includes the current frame n and four immediately preceding frames, i.e. [n−4, n]. Due to the relatively short window 12, the noise confidence score may quickly respond to any appearance of noise-like content immediately following other types of content (e.g., speech/dialog). Based on the noise confidence score of all frames in the segment, the noise detector further calculates a noise reliability ratio $w(n) \in [0,1]$ defined as the ratio of noise-like frames over all N frames in the n:th time segment (clip) 11.

The noise discriminator 4 calculates a PGC noise confidence score $x_{PGC}(n) \in [0,1]$ representing the likelihood of PGC noise in the frame. Similar to the noise reliability ratio, the PGC confidence score is calculated based on all frames in the segment 11. Therefore, the reliability ratio w(n) indicates whether the confidence scores provided by the noise discriminator 4 are reliable or not.

In addition to the two-stage noise classifier 3, 4, the auxiliary classifiers 5*a*, 5*b* may be used to further increase the confidence of noise. As an example, the auxiliary classifiers may include a speech classifier 5*a* and a music classifier 5*b*, outputting a speech confidence score $x_{SP}(n)$ and a music confidence score $x_{mu}(n)$. As indicated in FIG. 2, these confidence scores are also computed based on frames in the time segment 12.

The controller 5 will calculate a volume leveling control signal y(n) for the n-th frame. The control signal y(n) should be equal to the previous value y(n−1) as long as the noise reliability ratio w(n) is below a given threshold $T_w$. When the noise reliability ratio w(n) exceeds the threshold, the control signal y(n) should be adjusted based on the classification results, including the PGC noise confidence score.

In the present implementation, the control signal y(n) is formed as a weighted combination of the leveling control signal for the previous frame, y(n−1), and a term y'(n) based on the classification results. This can be written as:

$$y(n) = \alpha_u(n)y'(n) + (1 - \alpha_u(n))y(n-1), \quad (1)$$

where $\alpha_u(n)$ is a weighting coefficient that will be discussed below.

It can easily be seen that y'(n) should be equal to y(n−1) when the noise reliability ratio w(n) is below the threshold $T_w$ (to ensure that y(n) is also equal to y(n−1)). When the noise reliability ratio w(n) exceeds the threshold $T_w$, y'(n) may be a function of the noise reliability ratio w(n) and the PGC noise confidence score $x_{PGC}$ (n).

To achieve this, y'(n) can be defined by $$y'(n) = \alpha_r(n)(1 - x_{PGC}(n)) + (1 - \alpha_r(n))y(n-1) \quad (2)$$

where $\alpha_r$ denotes a reliable factor defined by $$\alpha_r(n) = \begin{cases} \gamma w(n), & w(n) \geq T_1 \\ 0, & \text{otherwise} \end{cases} \quad (3)$$

and $\gamma$ is a preset constant. According to equation (2) and (3), the higher reliability ratio w(n), the more weight will be assigned for $(1-x_{PGC}(n))$, meaning the bigger influence of for $x_{PGC}$ (n) on y'(n).

Returning to equation (1), it would be beneficial to update the control signal more quickly if the following conditions are satisfied simultaneously: low speech confidence, low music confidence, and high noise confidence. This can be achieved by properly setting the weighting coefficient $\alpha_u(n)$ as $$\alpha_u(n) = \beta(1 - x_{mu}(n))(1 - x_{sp}(n))w_{PGC}(n) \quad (4)$$

where $\beta \in (0,1)$ is a constant. A high likelihood of PGC noise type will lead to a large $\alpha_u(n)$, and thus a fast updating of the control signal (heavy weighting of y'(n)).

The volume leveling control signal y(n) is used to adjust the dynamic range controller (DRC) in the volume leveling unit 1. Noise related to UGC will result in a large control signal and cause a large reduction of the DRC gain. In contrast, noise related to PGC will lead to a low control signal/steering signal, maintaining the original behavior of the DRC.

In one example, the control signal y(n) is first clamped and normalized to get a steering signal s(n):

$$s(n) = \frac{\max(0, y(n) - T_2)}{1 - T_2} \quad (5)$$

where $T_2 \in (0,1)$ is another preset threshold.

Given an original DRC gain $g_{DRC}$, the reduced DRC gains can be obtained by $$g'_{DRC} = (1 - s(n))g_{DRC} \quad (6)$$

Figure 3:
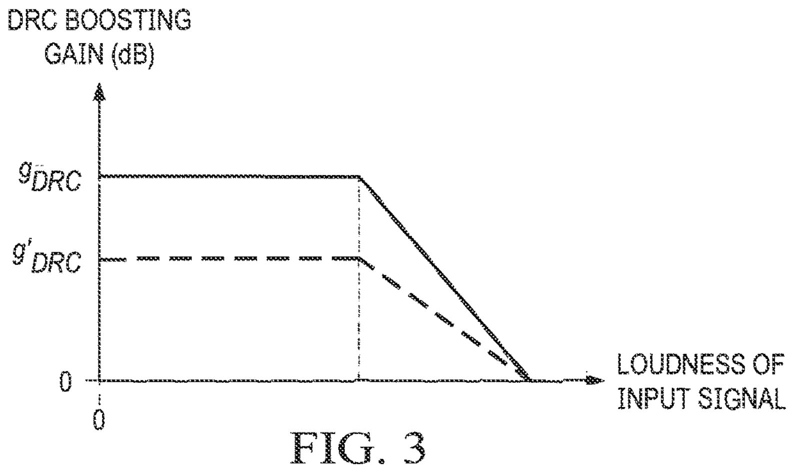
FIG. 3 shows how the gain characteristics of a volume leveling unit is reduced by a control signal according to an embodiment of the present invention.

The original and reduced boosting gain curves of DRC are illustrated in FIG. 3. It is clear that in the loudness range where the volume leveling unit 1 is active, the adjusted DRC gain $$g'_{DRC}$$

is lower than the original DRC gain $g_{DRC}$.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Note that when the method includes several elements, e.g., several steps, no ordering of such elements is implied, unless specifically stated. Furthermore, an element described herein of an apparatus embodiment is an example of a means for carrying out the function performed by the element for the purpose of carrying out the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, different amounts of overlap between successive segments may be implemented. Also, the time windows used to determine various confidence scores may include not only look-back frames but also look-ahead frames (at the cost of certain delay).

The invention claimed is:

1. A method for applying volume leveling of an audio signal including a plurality of time segments each consisting of a set of N frames, the method comprising:
- providing a volume leveling control signal,
- applying volume leveling to the audio signal using the volume leveling control signal,
- identifying, in a current time segment, all noise-like frames which are likely to contain noise, and determining a noise reliability ratio w(n) as a ratio of noise-like frames over all frames in the current time segment;
- determining, for the current time segment, a professionally generated content, PGC, noise confidence score $x_{PGC}(n)$ indicating a likelihood that PGC noise is present in the current time segment;
- determining, for the current time segment, whether the noise reliability ratio is above a predetermined threshold; and
- when the noise reliability ratio is above the predetermined threshold, updating the volume leveling control signal based on the PGC noise confidence score, and when the noise reliability ratio is below the predetermined threshold, keeping the volume leveling control signal unchanged.

2. The method according to claim 1, comprising determining, for each frame in the current segment, a noise confidence score $x_{noise}(n)$ indicating a likelihood that noise is present in the frame, and considering the frame as noise-like when said likelihood is above a given threshold.

3. The method according to claim 2, wherein the noise confidence score $x_{noise}(n)$ of a current frame is based on the audio content in a window including a set of M consecutive frames including the current frame.

4. The method according to claim 1, wherein the volume leveling control signal is updated on a frame-by-frame basis.

5. The method according to claim 4, wherein a current time segment overlaps a previous time segment by N−1 frames.

6. The method according to claim 4, wherein an impact of the PGC noise confidence score on each update of the volume leveling control signal is proportional to the noise reliability ratio.

7. The method according to claim 4, wherein the updated volume leveling control signal for a current frame is formed by weighting a volume leveling control signal for a previous frame with an updating value based on the PGC noise confidence score.

8. The method according to claim 7, wherein an impact of the PGC noise confidence score on the updating value is proportional to the noise reliability ratio.

9. The method according to claim 7, further comprising determining, for each frame, a noise confidence score indicating the presence of noise, and at least one auxiliary confidence score indicating the presence of a predetermined type of audio content,
- wherein said weighting is performed using a weighting factor based on the noise confidence score and said at least one auxiliary confidence score.

10. The method according to claim 9, wherein the predetermined type of content includes at least one of music content and speech content.

11. A system for volume leveling of an audio signal including a plurality of time segments each consisting of a set of N frames, the system comprising one or more processors configured to:
- identify, in a current time segment, all noise-like frames which are likely to contain noise, and determining a noise reliability ratio w(n) as a ratio of noise-like frames over all frames in the current time segment;
- determine, for the current time segment, a professionally gen ated content, PGC, noise confidence score $x_{PGC}(n)$ indicating a likelihood that PGC noise is present in the time segment;
- provide a volume leveling control signal,
- determine, for the current time segment, whether the noise reliability ratio is above a predetermined threshold,
- when the noise reliability ratio is above the predetermined threshold, update the volume leveling control signal based on the PGC noise confidence score, and
- when the noise reliability ratio is below the predetermined threshold, keep the volume leveling control signal unchanged.

12. The system in claim 11, wherein the noise detector and the noise discriminator implement one or more suitably trained machine learning systems.

13. A non-transitory computer readable storage medium comprises instructions which, when executed by one or more processors, cause the one or more processors to perform the method according to claim 1.

14. The system of claim 12, wherein the one or more suitably trained machine learning systems comprise an adaptive boosting system.

15. The system of claim 12, wherein the one or more suitably trained machine learning systems comprise a neural network.

* * * * *